United States Patent [19]

Cini et al.

[11] 4,178,577

[45] Dec. 11, 1979

[54] LOW FREQUENCY HYDROPHONE

[75] Inventors: Hector J. Cini, Mystic; Theodore J. Meyers, Waterford, both of Conn.

[73] Assignee: The United States of America as represented by the Secretary of the Navy, Washington, D.C.

[21] Appl. No.: 875,056

[22] Filed: Feb. 6, 1978

[51] Int. Cl.[2] .............................................. H04B 13/00

[52] U.S. Cl. .................................... 367/159; 367/166; 367/171

[58] Field of Search .................. 340/8 R, 8 LF, 8 PC, 340/9, 10, 12, 13; 310/334, 336, 337

[56] References Cited

U.S. PATENT DOCUMENTS

| | | | |
|---|---|---|---|
| 2,571,899 | 10/1951 | Kroft et al. | 340/10 |
| 3,263,209 | 7/1966 | Madison | 340/10 |
| 3,328,752 | 6/1967 | Sims | 340/8 LF |
| 3,391,385 | 7/1968 | Lubell | 340/8 R |
| 3,660,809 | 5/1972 | Pearson | 340/8 S |
| 3,713,086 | 1/1973 | Trott | 340/10 |
| 3,731,266 | 5/1973 | Ammann | 340/8 LF |
| 3,781,781 | 12/1973 | Groves, Jr. | 340/9 |

*Primary Examiner*—Harold J. Tudor

*Attorney, Agent, or Firm*—Richard S. Sciascia; Arthur A. McGill; Prithvi C. Lall

[57] ABSTRACT

A pressure-balanced hydrophone having a low cut-off frequency which includes a pair of piezo-ceramic tubes, wired in series, and having one end of each tube secured to a metal block in the center. The second end of one of the ceramic tubes is covered by means of a solid metal end cap and the second end of the other ceramic tube is covered by a porous sintered metal end cap. The unit is enclosed in an elastomeric cylindrical boot which is closed at the open end by a metallic disc. A pair of fill plugs are provided to fill the interior and the exterior of the piezo-ceramic tubes with a suitable oil. The unique feature of subject device is that a plurality of pores in the porous sintered metal end cap act as a plurality of capillaries for pressure balancing and thus make the hydrophone insensitive to hydrostatic pressure variations.

9 Claims, 3 Drawing Figures

LOW FREQUENCY HYDROPHONE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a hydrophone for measuring acoustic ambient noise in the ocean at low frequencies and more particularly to an inexpensive pressure balanced, high receiving sensitivity hydrophone.

Piezoelectric materials can be formed in a variety of shapes and be polarized in a number of directions, but the most common type of assembly is a ceramic tube electroded on its inner and outer surfaces and polarized in the radial direction. A radially poled tube can be waterproofed and can be used directly as a hydrophone. Such a hydrophone has no depth limit but it sensitivity is very low because the acoustic pressure acts on all surfaces and any charges (voltages) which are generated are proportional only to the change in volume. A preferred method is to acoustically shield the interior of the ceramic tube so that the acoustic pressure acts on only one surface and generates larger voltages. The interior shielding of the ceramic tubes can be accomplished in several ways. As an example, the interior surface can be covered with a "pressure releasing material" such as air containing foams. Alternatively, rigid end caps can be applied to the ends of the tube trapping a volume of air in the interior of the tube and thus shielding the interior of the tube. The sensitivity of the hydrophone using such a shielded ceramic tube is much higher than that of a hydrophone using an unshielded tube of the same geometry. However, the hydrophone using a shielded ceramic tube has a limited depth capability because the pressure releasing material such as foam gets compressed and the ceramic tube fractures in the air-filled device. If the ceramic tube is capped with rigid end caps and is filled with a fluid, the rigid end caps provide the necessary shielding function and the hdyrophone has a sensitivity approaching (but not equalling) the sensitivity of a hydrophone using an air-filled ceramic tube. The sensitivity loss is dependent upon the compliance of the fluid used for filling the ceramic tube and the dimensions of the tube. In order that the hydrophone be pressure balanced, it is necessary that one end cap be vented to a reservoir of the fluid filling the ceramic tube by means of an orifice or a capillary.

Thus pressure balancing in hydrophones can be achieved in many ways. One such technique is to use oppposed pressure relief valves and another one is to use a capillary tube. The use of opposed pressure relief valves is very effective in pressure balancing and results in a hydrophone which has good response characteristics at low frequencies and high pressures. However, this approach limits the size of the hydrophone which can be built since the internal diameter of a sphere or a tube used must be large enough to accomodate the pressure reilef valves. The most commonly used approach to pressure balancing is to use a capillary tube which is placed in one end cap of a rigidly end cap tube or is used to pierce the wall of a sphere. One such design has been described in U.S. Pat. No. 3,781,781 by Iver D. Groves. At very low frequencies the capillary tube provides a low acoustic impedance which allows balancing of the hydrostatic pressure. At some higher frequency, the capillary presents a high acoustic impedance and the hydrophone receiving sensitivity approaches to that of hydrophone having a totally enclosed sphere or a ceramic tube with rigid end caps. Irrespective of the use of a capillary or pressure relief valve, the receiving sensitivity of an oil-filled hydrophone having end cap tube or end-closed sphere is less than that which can be achieved for a hydrophone having an air-filled tube. The degree of departure from the ideal air-filled case is dependent upon the characteristic of the filling oil.

Besides the pressure balancing of the hydrophone, a capillary tube also limits the utility of the hydrophone at low frequency because the capillary looks like a low acoustic impedance at some low frequency. The low frequency cut-off, defined as the frequency at which the sensitivity decreases by 3 db is given by:

$$f=a^4d\,c^2/16\times LV$$

where x is the viscosity of the oil used; L is the effective capillary length; V is the internal volume of the oil; a is the internal diameter of the capillary; d is the density of the oil and c is the speed of sound in the oil.

From the above relationship, it should be possible, in principle, to place the cut-off frequency as low as one would desire simply by properly choosing dimensions but there are physical limitationson the size of capillary which can be fabricated and assembled particularly in the case where small size and low frequency sensitivity are required. As an exmale, a hydrophone constructed of two end-glued cylinders each with an internal diameter of 1.3 cms and wall thickness of 1.6 m.m and of a length 1.3 cms filled with castor oil and using capillary 6.3 m.m long with an nternal diameter of 0.127 m.m would have a cut-off frequency of 25 to 30 Hz. This problem is further complicated by the fact that transfer phase considerations dictate that the frequency cut-off should be placed at least a decade below the lowest frequency at which operation is desired. It is thus desirable to have a high receiving sensitivity acoustic hydrophone which has a low cut-off frequency and which is pressure balanced, i.e., which is essentially insensitive to high static pressure.

SUMMARY OF THE INVENTION

The pressure-balanced hydrophone of the present invention which has a low cut-off frequency includes a pair of piezo-ceramic tubes, wired in series, and having one end of each tube secured to a metal block in the center. The second end of the ceramic tube is covered by means of a solid metal end cap and the second end of the other ceramic tube is covered by a porous sintered metal end cap. The tubes are enclosed in an elastomeric cylindrical boot which is closed at its open end by a metallic disc. A pair of fill plugs, one in the solid metal end cap and one in the metallic disc, are provided to fill the interior and the exterior of the piezo-ceramic tubes with a suitable oil. The plurality of pores in the porous sintered metal end cap act as a plurality of capillaries for pressure balancing and thus make the hydrophone insensitive to hdyrostatic pressure variations.

An object of subject invention is to have a pressure-balanced hydrophone having a low cut-off frequency.

Another object of subject invention is to have a low cut-off frequency pressure-balanced hydrophone which is easy to fabricate.

Still another object of subject invention is to make a pressure-balanced hydrophone having a low cut-off frequency which is relatively inexpensive.

Still another object of subject invention is to have a low cut-off frequency hydrophone which eliminates the use of small capillary tubes inserted in one of the end caps.

Still another object of subject invention is to have a low cut-off frequency pressure-balanced hydrophone which is not destroyed by a contaminant plugging the capillary.

Still another object of the subject invention is to have a pressure-balanced hydrophone which is small enough in size to be used in a line array.

Other objects, advantages and novel features of the invention will become apparent from the following detailed description of the invention when considered in conjunction with the accompanying drawings wherein:

DESCRIPTION OF A PREFERRED EMBODIMENT

Figure 1:
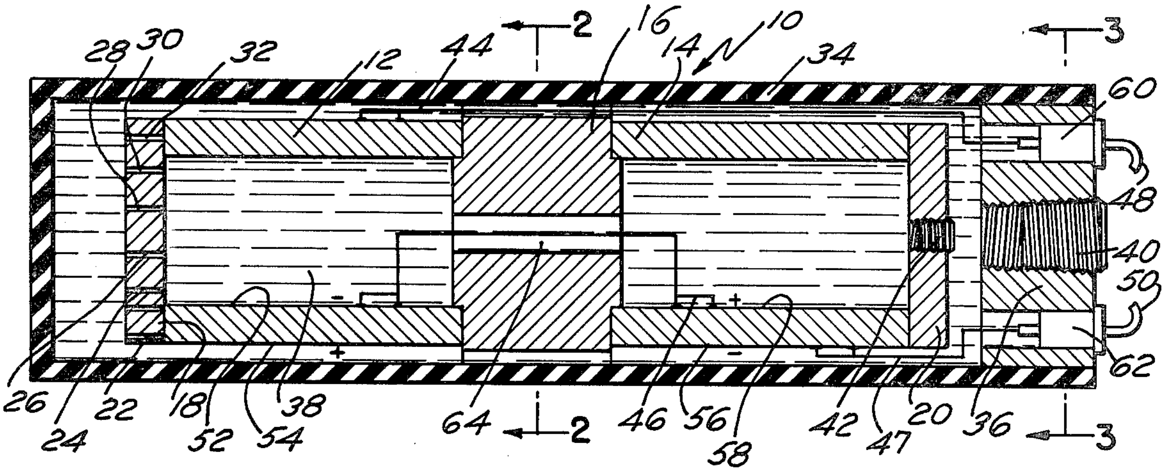
FIG. 1 is a cross-sectional view of a low cut-off frequency hydrophoe built according to the teachings of subject invention.
Figure 2:
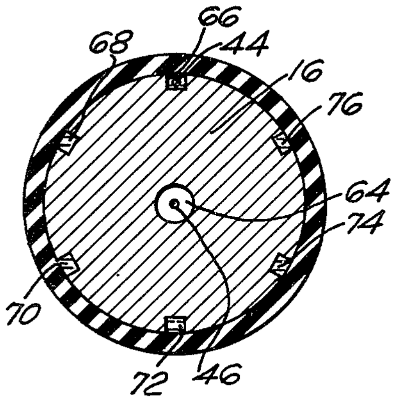
FIG. 2 is a cross-section of FIG. 1 taken along line 2—2.
Figure 3:
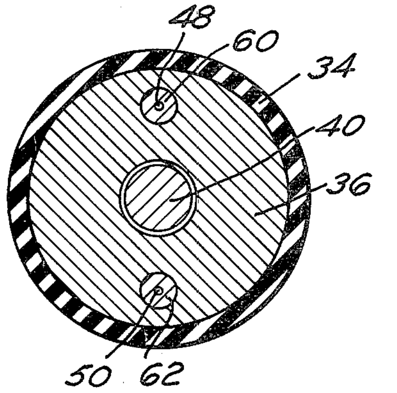
FIG. 3 is a cross-section of FIG. 1 taken along line 3—3.

Referring to the drawings wherein like reference characters designate like parts throughout the several views, and more particularly to FIG. 1 thereof, a cross-sectional view of a low cut-off frequency acoustic transducer built according to the teachings of subject invention is shown. Transducer 10 includes two piezo-ceramic tubes 12 and 14 which have been oppositely poled, i.e., the inside of ceramic tubes 12 and 14 have opposite polarity and the same holds for their respective outsides. Tubes 12 and 14 are wired in series to provide increased receiving sensitivity and acceleration cancellation. The piezo-ceramic tubes 12 and 14 are secured to a central metal block 16 by a glue or the like. Tube 12 is terminated on its other end by a porous sintered metal end cap 18 and tube 14 is terminated at its other end by a solid metal end cap 20. Sintered metal end cap 18 has a plurality of pores csuch as 22, 24, 26, 28, 30, and 32 which act as capillaries and affect the cut-off frequency of the hydrophone. Piezo-ceramic tubes 12 and 14 and block 16 are enclosed in an elastomeric boot 34 which is closed at its open end by a metal disc 36. Both the interior and exterior of the ceramic tubes are filled with a suitable oil 38 such as castor oil or a silcone oil. The oil used is such that it has high compliance or low acoustic stiffness to A.C. or oscillatory pressure variations and high acoustic stiffness to D.C. or static pressure. Oil filling is done under vacuum and is accomplished through fill plug 40 in metallic disc 36 and plug 42 in solid end cap 20. Electrical leads 44 and lead 46 through wire 47 are brought to terminals 48 and 50 respectively. As shown in FIG. 1, interior surface 52 of piezo-ceramic tube 12 is poled negative an its exterior surface 54 is poled positive. Furthermore, the exterior surface 56 of piezo-ceramic tube 14 is poled negative and its interior surface 58 is poled positive. Terminals 48 and 50 are insulated from metallic disc 36 by means of insulators 60 and 62. Opening 64 in block 16 is for feeding the leads therethrough. Similar use is made of openings 66, 68, 70, 72, 74 and 76 in block 16.

The new feature of utilization of a porous sintered metal end cap rather than a solid metal end cap with a capillary tube is that the pieces with extremely small openings (down to 20 microns) can be easily fabricated and hence the hydrophone with extremely small values of cut-off freuqency can be constructed. Furhermore, the construction of hydrophones is simplified and is less expensive as the preformed porous end caps can be glued in place as opposed to solid end caps which require drilling of the end cap and insertion of a very small capillary tube. Furthermore, in the size range where the capillary tube might be usable, the porous end caps have further advantages in terms of cost and reliability. In terms of cost, the solid end cap with capillary tube has a cost which is many times the cost of fabricating a sintered metal end cap. Besides, in the usual solid end cap wih a capillary tube, there is only one opening and should that opening become plugged with an oil contaminant, the hydrophone performance is compromised. On the other hand, in the case of porous sintered metal end caps there is a plurality of opening or pores and it is the largest opening or pore which governs the cut-off frequency. Should an opening become clogged with a contaminant, it should have no effect on hydrophone performance if it is not the largest opening. Should the largest opening become clogged, the next largest opening would govern the cut-off frequency with a resultant lowering of the cut-off frequency which is desirable.

Briefly stated, a pressure-balanced hydrophone having a low cut-off frequency includes a pair of piezo-ceramic tubes which are wired in series. One end of each of the two tubes is secured to a metal block in the center, the second end of one of the ceramic tubes is covered by means of a solid metal end cap and the second end of the other ceramic tube is covered by a porous sintered metal end cap. The tubes are enclosed in an elastomeric cylindrical boot which is closed at its open end by means of a metallic disc. A pair of fill plugs, one in the solid metal end cap and one in the metallic disc, are provided to fill the interior and the exterior of the piezo-ceramic tubes with a suitable oil such as castor oil or a silicone oil. The oil used has low acoustic compliance of hydrostatic (D.C.) pressure and high acoustic compliance of oscillatory (A.C.) pressure. The plurality or pores or openings in the porours sintered metal end cap act as a plurality of capillaries for pressure-balancing and thus make the hydrophone insensitive to hydrostatic pressure variations.

Obviously, many modifications and variations of the present invention may become apparent in the light of the above teachings. As an example, the use of porous sintered metal disc is equally applicable to single cylinders, a large number of cylinders or spheres or parallel wired cylinders without deviating from the teachings of subject invention. Furthermore, the design parameters such as the nature of the oil used to fill inside and outside of the piezo-ceramic tubes, the material for fabricating sintered material end cap can be varied so as to influence the cutoff frequency of the hydrophone. It is therefore understood that within the scope of the appended claims the invention may be practiced otherwise than specifically described.

We claim:

1. A pressure-balanced acoustic transducer having a low cut-off frequency in a liquid medium comprising:
- a plurality of piezo-ceramic tubes being connected together forming a unit with one end of one of said plurality of piezo-ceramic tubes forming a first open end of said unit and one end of another one of said plurality of piezo-ceramic tubes forming a second open end of said unit;
- a solid cap means being secured to the first open end of said unit;
- a sintered metal cap means having a plurality of pores therein, being secured to the second open end of said unit;
- a flexible boot for housing said unit, said flexible boot having an open end;
- means for covering said flexible boot at the open end thereof;
- a fluid for filling said flexible boot and said unit of said plurality of piezo-ceramic tubes;
- means for filling said flexible boot and said unit of said plurality of piezo-ceramic tubes with said fluid; and
- means for extracting voltage signals responsive to an acoustic wave impinging upon said acoustic transducer in the liquid medium.

2. The acoustic transducer of claim 1 wherein said fluid for filling said boot and said unit of said plurality of piezo-ceramic tubes is an oil having relatively high acoustic compliance for pressure variations due to the acoustic wave impinging on said transducer in the liquid medium.

3. The acoustic transducer of claim 2 wherein said oil is castor oil.

4. The acoustic transducer of claim 2 wherein said oil is a silicone oil.

5. The acoustic transducer of claim 1 wherein said means for extracting voltage signals includes a plurality of electrical leads being connected to said open ends of said unit of said plurality of piezo-ceramic tubes.

6. The acoustic transducer of claim 1 wherein said plurality of piezo-ceramic tubes includes a pair of generally cylindrical tubes connected in series to a metal block.

7. The acoustic transducer of claim 6 wherein said sintered cap means includes a plurality of pores therein.

8. The acoustic transducer of claim 1 wherein said solid cap means includes a plug for filing said flexible boot with said fluid under vacuum.

9. The acoustic transducer of claim 8 wherein said means for covering said flexible boot includes a plug therein for filling said flexible boot with said fluid.

* * * * *